United States Patent
Oidemizu et al.

(10) Patent No.: US 11,553,575 B2
(45) Date of Patent: Jan. 10, 2023

(54) SERVER APPARATUS, INFORMATION PROCESSING SYSTEM, AND OPERATING METHOD FOR SYSTEM

(71) Applicant: TOYOTA JIDOSHA KABUSHIKI KAISHA, Toyota (JP)

(72) Inventors: Takayuki Oidemizu, Nagakute (JP); Kazuyuki Inoue, Nagoya (JP); Ryosuke Kobayashi, Nagakute (JP); Yurika Tanaka, Yokosuka (JP); Tomokazu Maya, Nagoya (JP); Satoshi Komamine, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/350,017

(22) Filed: Jun. 17, 2021

(65) Prior Publication Data
US 2022/0007483 A1    Jan. 6, 2022

(30) Foreign Application Priority Data

Jul. 1, 2020  (JP) .............................. JP2020-114375

(51) Int. Cl.
*H05B 47/115* (2020.01)
*F21S 8/00* (2006.01)
*H04L 67/12* (2022.01)

(52) U.S. Cl.
CPC ............ *H05B 47/115* (2020.01); *F21S 8/032* (2013.01); *H04L 67/12* (2013.01)

(58) Field of Classification Search
CPC ........ H05B 47/115; F21A 8/032; H04L 67/12
See application file for complete search history.

(56) References Cited

U.S. PATENT DOCUMENTS

| 11,082,667 | B2 * | 8/2021 | Deyle | G05D 1/0088 |
|---|---|---|---|---|
| 2001/0043719 | A1 * | 11/2001 | Harakawa | G06F 3/011 |
| | | | | 382/106 |
| 2007/0103902 | A1 * | 5/2007 | Hsiao | F21V 3/04 |
| | | | | 362/240 |
| 2007/0159814 | A1 * | 7/2007 | Jacobsson | G09F 19/22 |
| | | | | 362/153 |
| 2010/0217669 | A1 * | 8/2010 | Gazdzinski | G05B 15/02 |
| | | | | 345/173 |

(Continued)

FOREIGN PATENT DOCUMENTS

| CN | 106717118 A * | 5/2017 | .............. F24F 11/30 |
|---|---|---|---|
| DE | 102018128948 A1 * | 7/2019 | .............. E05F 15/73 |

(Continued)

*Primary Examiner* — Abdullah A Riyami
*Assistant Examiner* — Syed M Kaiser
(74) *Attorney, Agent, or Firm* — Oliff PLC

(57) ABSTRACT

A server apparatus includes a communication interface and a controller configured to transmit and receive information via the communication interface, wherein the controller is configured to transmit an instruction for controlling light emission by a plurality of floor coverings, each floor covering including a light emitting element, to the plurality of floor coverings based on positional information for a first point where a pedestrian is located in an area where the plurality of floor coverings are disposed and positional information for a second point different from the first point in the area.

7 Claims, 6 Drawing Sheets

(56) References Cited

U.S. PATENT DOCUMENTS

2011/0112875 A1\* 5/2011 Johnson ............... G06Q 10/063
                                                    705/7.11
2020/0050206 A1\* 2/2020 Deyle ................... G01S 13/881
2021/0072457 A1\* 3/2021 Duce ................... F21V 23/0471

FOREIGN PATENT DOCUMENTS

| JP | 6118342 B2 | 4/2017 | |
|----|------------|--------|---|
| WO | 2013/102835 A1 | 7/2013 | |
| WO | WO-2013102835 A1 \* | 7/2013 | ............ E04F 15/082 |

\* cited by examiner

SERVER APPARATUS, INFORMATION PROCESSING SYSTEM, AND OPERATING METHOD FOR SYSTEM

CROSS-REFERENCE TO RELATED APPLICATION

The present application claims priority to Japanese Patent Application No. 2020-114375, filed on Jul. 1, 2020, the entire contents of which are incorporated herein by reference.

TECHNICAL FIELD

The present disclosure relates to a server apparatus, an information processing system, and an operating method for a system.

BACKGROUND

Floor panels provided with a light emitting function are known. Such panels are used as floor coverings in indoor and outdoor commercial facilities or the like and provide decoration by emitting light towards pedestrians walking on the panels. For example, patent literature (PTL) 1 discloses technology for providing a light emitting element in a structural element attached to a floor or the like.

CITATION LIST

Patent Literature

PTL 1: JP 6118342 B2

SUMMARY

The convenience of pedestrians could be improved by using floor coverings provided with a light emitting function.

The present disclosure provides a server apparatus and the like that can improve convenience for pedestrians by using floor coverings provided with a light emitting function.

A server apparatus according to the present disclosure includes:

a communication interface; and a controller configured to transmit and receive information via the communication interface, wherein the controller is configured to transmit an instruction for controlling light emission by a plurality of floor coverings, each floor covering including a light emitting element, to the plurality of floor coverings based on positional information for a first point where a pedestrian is located in an area where the plurality of floor coverings are disposed and positional information for a second point different from the first point in the area.

A system according to the present disclosure includes a server apparatus and a plurality of floor coverings, each floor covering being configured to communicate with the server apparatus and comprising a light emitting element, wherein the server apparatus is configured to transmit an instruction for controlling light emission by the plurality of floor coverings to the plurality of floor coverings based on positional information for a first point where a pedestrian is located in an area where the plurality of floor coverings are disposed and positional information for a second point different from the first point in the area, and the plurality of floor coverings are configured to cause the light emitting element to emit light in accordance with the instruction.

An operating method for an information processing system according to the present disclosure is an operating method for an information processing system including a server apparatus and a plurality of floor coverings, each floor covering being configured to communicate with the server apparatus and including a light emitting element, the operating method including:

transmitting, by the server apparatus, an instruction for controlling light emission by the plurality of floor coverings to the plurality of floor coverings based on positional information for a first point where a pedestrian is located in an area where the plurality of floor coverings are disposed and positional information for a second point different from the first point in the area; and causing, by the plurality of floor coverings, the light emitting element to emit light in accordance with the instruction.

According to the server apparatus and the like in the present disclosure, the convenience of pedestrians can be improved by using floor coverings provided with a light emitting function.

DETAILED DESCRIPTION

Embodiments are described below.

Figure 1:
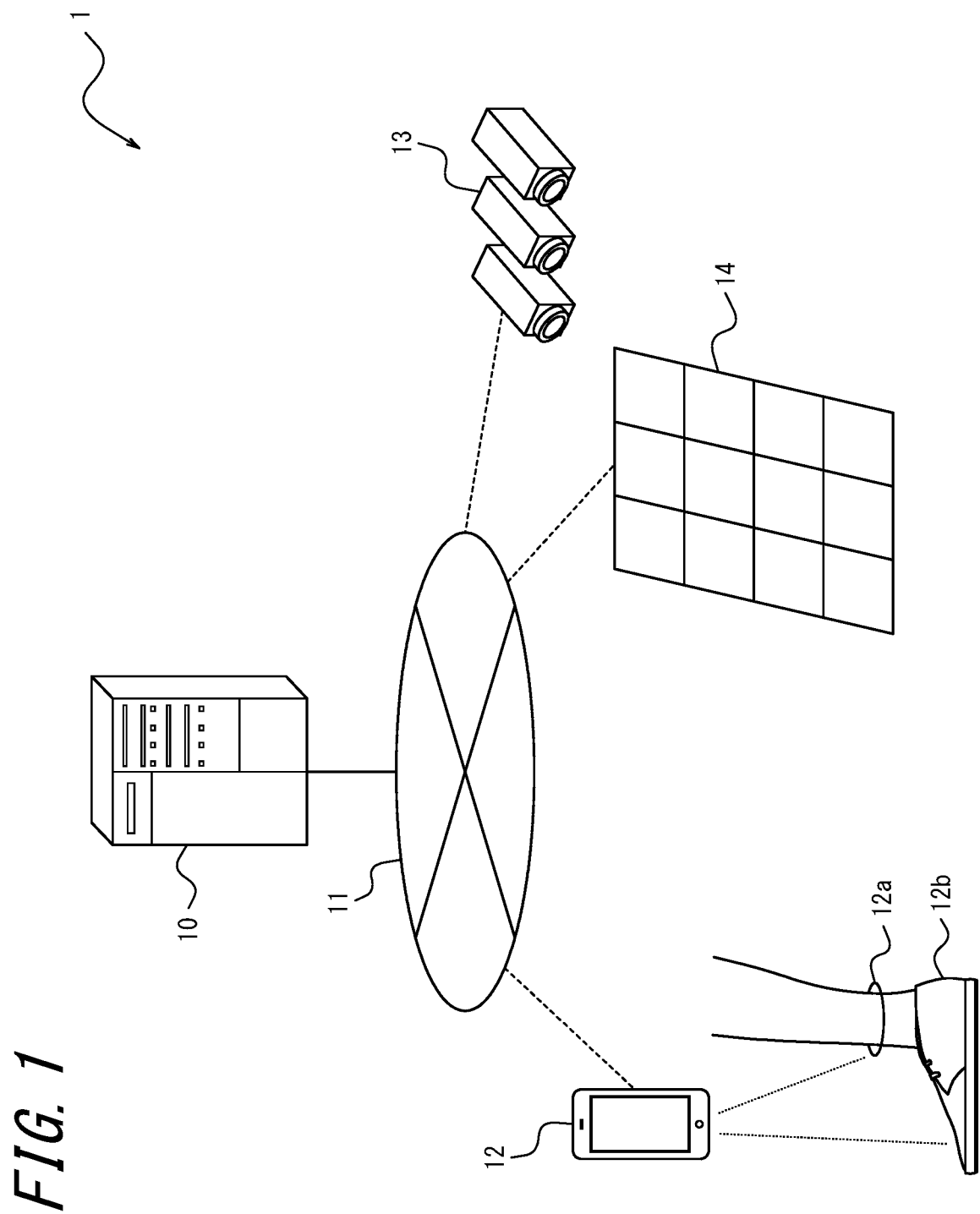
FIG. 1 is a diagram illustrating a configuration example of an information processing system.

FIG. 1 is a diagram illustrating a configuration example of an information processing system according to an embodiment. The information processing system 1 includes, for example, one or more of each of a server apparatus 10, a terminal apparatus 12, an imaging apparatus 13, and a floor covering 14, all communicably connected to each other via a network 11. The server apparatus 10 is a computer. The terminal apparatus 12 is a portable information terminal apparatus provided with a communication function, such as a smartphone, a tablet terminal apparatus, or a smartwatch. The terminal apparatus 12 communicates with a communication apparatus provided in an anklet 12a, a shoe 12b, or the like worn by a pedestrian. The imaging apparatus 13 includes one or more cameras and a corresponding control apparatus, for example. The cameras of the imaging apparatus 13 are installed at locations in an area within an urban zone or the like and capture images of pedestrians in the area. The area is, for example, an area encompassing one or more blocks of an urban zone and is freely set as a unit for providing an information service with the information processing system 1 to pedestrians. The floor covering 14 is provided with a communication function together with a light emitting function using a light emitting element and is laid in a two-dimensional array on the road surface where the pedestrian walks in the area. The network 11 is the Internet, for example, but may also include an ad-hoc network, a LAN, a Metropolitan Area Network (MAN), other networks, or a combination of two or more thereof. The number of constituent elements contained in the information processing system 1 may be greater than the case illustrated here.

In the information processing system 1, the server apparatus 10 transmits an instruction, to a plurality of floor coverings 14 each having a light emitting element, to control light emission by the plurality of floor coverings 14 based on positional information on a first point where a pedestrian is located in an area where the plurality of floor coverings 14 are arranged and positional information on a second point different from the first point. The floor coverings 14 then each emit light with the emitting element in response to the instruction from the server apparatus 10. For example, by the floor covering 14 emitting light in any appropriate pattern (such as flashing) along a route from the point where the pedestrian is located to the destination of the pedestrian, the pedestrian is guided to the destination. The convenience for the pedestrian is improved, since the pedestrian can recognize the route to the destination by looking at the road surface without watching route guidance by the terminal apparatus 12 that the pedestrian is carrying.

Figure 2:
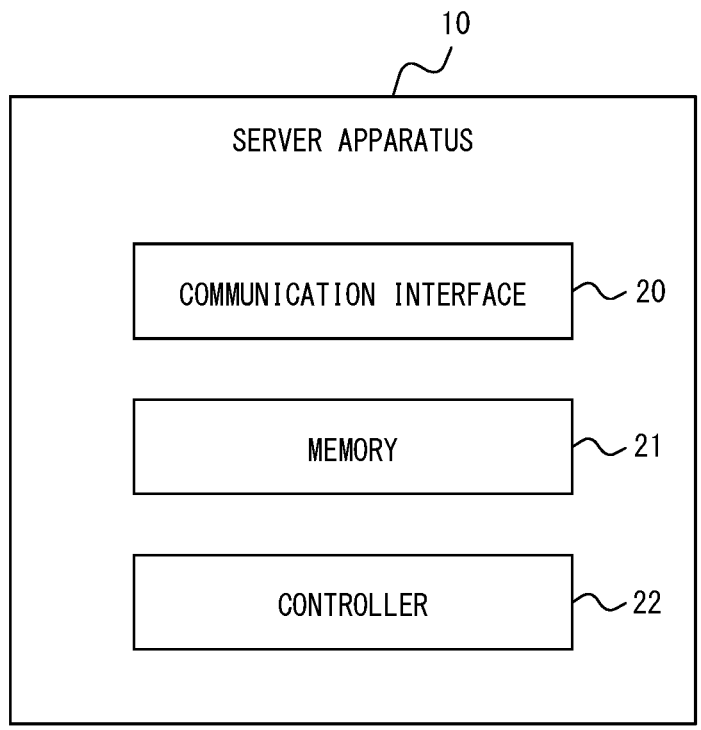
FIG. 2 is a diagram illustrating a configuration example of a server apparatus.

FIG. 2 illustrates a configuration example of the server apparatus 10. The server apparatus 10 includes a communication interface 20, a memory 21, and a controller 22. The server apparatus 10 may execute operations in the present embodiment by communicating and working in cooperation with another server apparatus having an equivalent configuration to the configuration of the server apparatus 10. For example, a server may be installed in each area to control the operation of the floor coverings 14 in that area, and the server apparatus 10 may be configured by the servers in each area cooperating with a central server.

The communication interface 20 includes one or more communication modules, compliant with wired or wireless LAN standards, for connecting to the network 11. In the present embodiment, the server apparatus 10 is connected to the network 11 via the communication interface 20 and communicates information with other apparatuses through the network 11.

The memory 21 has, for example, a semiconductor memory, a magnetic memory, or an optical memory. The memory 21 functions as a main memory, an auxiliary memory, or a cache memory, for example. The memory 21 is configured to store any information, control/processing programs, and the like used for operations of the server apparatus 10.

The controller 22 has one or more general purpose processors such as Central Processing Units (CPUs) or one or more dedicated processors that are dedicated to specific processing. Alternatively, the controller 22 may have one or more dedicated circuits such as Field-Programmable Gate Arrays (FPGAs) or Application Specific Integrated Circuits (ASICs). The controller 22 is configured to perform overall control of the operations of the server apparatus 10 by operating according to the control/processing programs or operating according to operation procedures implemented in the form of circuits. The controller 22 transmits and receives various information to and from the terminal apparatus 12, the imaging apparatus 13, and the floor coverings 14 via the communication interface 20 and executes the operations according to the present embodiment.

Figure 3:
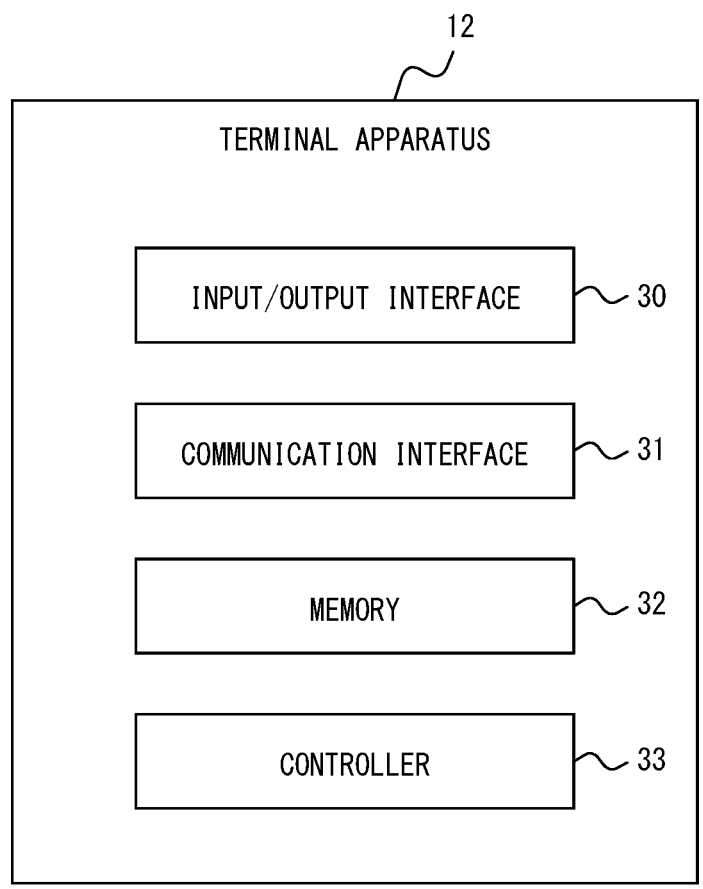
FIG. 3 is a diagram illustrating a configuration example of a terminal apparatus.

FIG. 3 illustrates a configuration example of the terminal apparatus 12. The terminal apparatus 12 is an information terminal apparatus such as a smartphone, a tablet terminal apparatus, a personal computer, or a smartwatch. The terminal apparatus 12 has an input/output interface 30, a communication interface 31, a memory 32, and a controller 33.

The input/output interface 30 has an input interface that is configured to detect inputs from a user and transmit input information to the controller 33. The input interface is, for example, any suitable input interface including physical keys, capacitive keys, a touch screen provided integrally with a panel display, various pointing devices, a microphone that accepts audio input, a camera that captures images or image codes, or the like. The input/output interface 30 also has an output interface that is configured to output information generated by the controller 33 or received from another apparatus to the user. The output interface is, for example, any suitable output interface including an external or built-in display that outputs image/video information, a speaker that outputs audio information, or a connection interface for connection with external output devices.

The communication interface 31 includes a communication module compliant with a wired or wireless LAN standard, a module compliant with a mobile communication standard such as the 4th Generation (4G) standard or the 5th Generation (5G) standard, a GPS receiving module, a short-range communication module, or the like. The terminal apparatus 12 is connected to the network 11 by the communication interface 31 via a nearby router apparatus or a base station for mobile communication, communicates information with the server apparatus 10 over the network 11, and communicates information with the floor covering 14 either directly or via the anklet 12a or shoe 12b, worn by the pedestrian, by communicating with a communication apparatus of the anklet 12a or shoe 12b using short-range communication. The terminal apparatus 12 also receives a GPS signal to request the positional information for the current location via the communication interface 31.

The memory 32 has, for example, a semiconductor memory, a magnetic memory, or an optical memory. The memory 32 functions as a main memory, an auxiliary memory, or a cache memory, for example. The memory 32 stores any information used for operations of the terminal apparatus 12, control/processing programs, and the like.

The controller 33 has one or more general purpose processors such as CPUs or Micro Processing Units (MPUs) or one or more dedicated processors that are dedicated to specific processing. Alternatively, the controller 33 may have 1 or more dedicated circuits such as FPGAs or ASICs. The controller 33 is configured to perform overall control of the operations of the terminal apparatus 12 by operating according to the control/processing programs or operating according to operation procedures implemented in the form of circuits. The controller 33 also transmits and receives various types of information to and from the server apparatus 10 or the like via the communication interface 31 and executes the operations according to the present embodiment.

Figure 4:
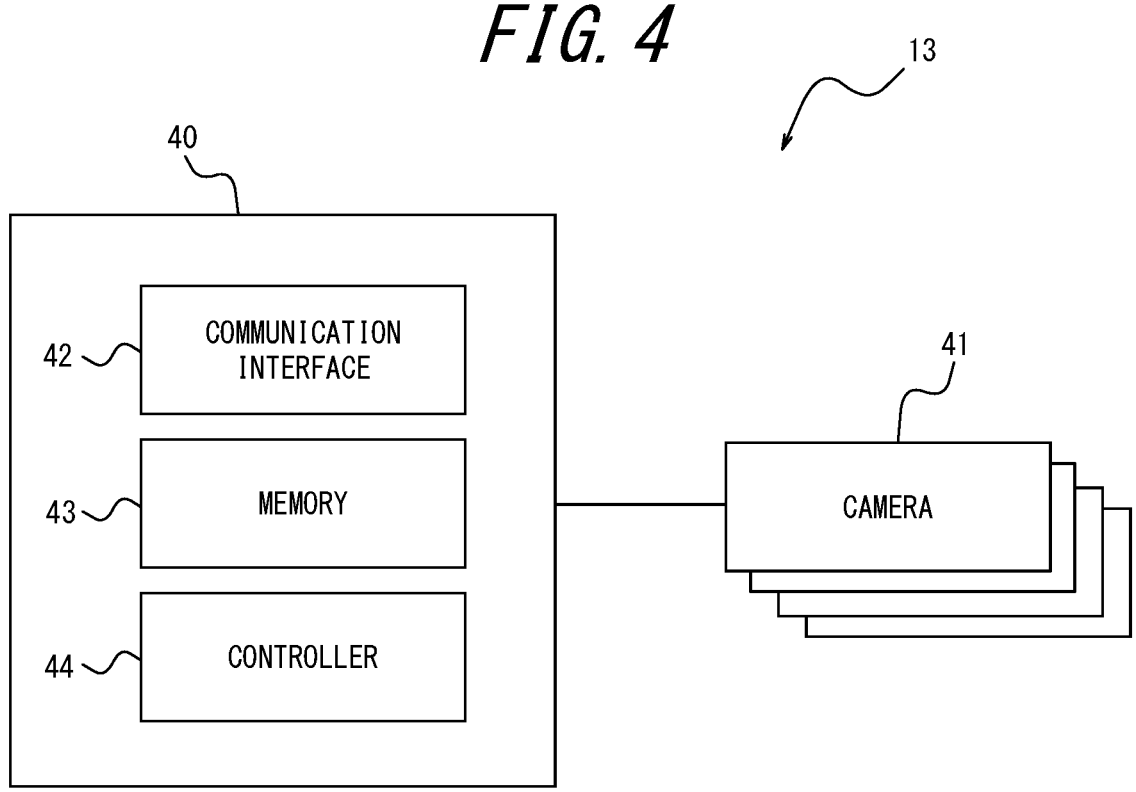
FIG. 4 is a diagram illustrating a configuration example of an imaging apparatus.

FIG. 4 illustrates a configuration example of the imaging apparatus 13. The imaging apparatus 13 includes one or more cameras 41 and a control apparatus 40 for controlling each camera 41. Each camera 41 is attached to any position capable of capturing images of a pedestrian in a predetermined area of an urban zone or the like. The camera 41 includes a monocular camera, a stereo camera, an omnidirectional camera, or the like. The control apparatus 40 includes a communication interface 42, a memory 43, and a controller 44. The control apparatus 40 is one or more computers that are connectable to the network 11 and function as an image delivery server.

The communication interface 42 includes a communication module, compliant with one or more wired or wireless LAN standards, for connecting to the network 11. In the present embodiment, the imaging apparatus 13 is connected to the network 11 via the communication interface 42 and communicates information with other apparatuses via the network 11.

The memory 43 has, for example, a semiconductor memory, a magnetic memory, or an optical memory. The memory 43 functions as, for example, a main memory, an auxiliary memory, or a cache memory. The memory 43 stores any information used for operations of the imaging apparatus 13, control/processing programs, and the like.

The controller 44 has one or more general purpose processors, such as a central processing unit (CPU), or one or more dedicated processors specialized for a particular process. Alternatively, the controller 44 may include one or more dedicated circuits such as a Field-Programmable Gate Array (FPGA), Application Specific Integrated Circuit (ASIC), and the like. The controller 44 is configured to perform overall control of the operations of the imaging apparatus 13 by operating according to the control/processing programs or operating according to operation procedures implemented in the form of circuits. The controller 44 executes the operations according to the present embodiment by transmitting images of an event and the audience captured by the imaging apparatus 13 to the server apparatus 10 via the communication interface 42 and receiving various instructions and information from the server apparatus 10 via the communication interface 42.

Figure 5:
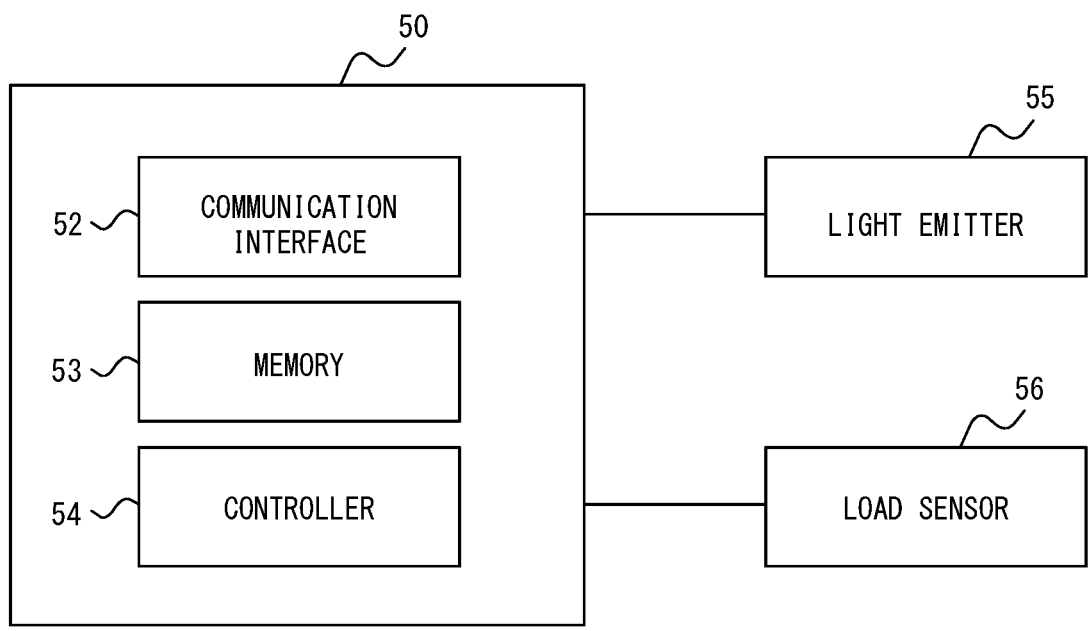
FIG. 5 is a diagram illustrating a configuration example of a floor covering.

FIG. 5 shows a configuration example of the floor covering 14. The floor covering 14 includes a control apparatus 50, a light emitter 55, and a load sensor 56. The floor covering 14 is, for example, rectangular or polygonal with sides measuring several tens of centimeters, or has a substantially circular flat plate shape with a diameter of several tens of centimeters. The floor covering 14 is, for example, formed to have a structure with layers of resin, wood-based material, or the like. The light emitter 55 includes, for example, a light emitting element such as one or more LEDs and a control circuit for the light emitting element. The light emitter 55 is controlled by the control apparatus 50 to turn the light emitting element on and off. The light emitter 55 is housed on the upper surface side when the floor covering 14 is laid on the road surface and is covered by a transparent cover, for example, so that a pedestrian walking on the floor covering 14 when the light emitting element emits light can see the light. The load sensor 56 is provided in a position capable of detecting the load applied to the upper surface when the floor covering 14 is laid on the road surface and transmits the detection result to the control apparatus 50.

The control apparatus 50 includes a communication interface 52, a memory 53, and a controller 54.

The communication interface 52 includes a communication module corresponding to one or more wired or wireless LAN standards and a short-range communication module for connecting to the network 11. The control apparatus 50 communicates information with the server apparatus 10 over the network 11 via the communication interface 52 and communicates information with the terminal apparatus 12 either directly or through the anklet 12a or shoe 12b via the communication interface 52.

The memory 53 has, for example, a semiconductor memory, a magnetic memory, or an optical memory. The memory 53 stores any information, control/processing procedures, and the like used for operation of the control apparatus 50.

The controller 54 has, for example, one or more dedicated processors specialized for a particular process. Alternatively, the controller 54 may include one or more dedicated circuits such as a Field-Programmable Gate Array (FPGA), Application Specific Integrated Circuit (ASIC), and the like. The controller 54 is configured to perform overall control of the operations of the floor covering 14 by operating according to the control/processing procedures or operating according to operation procedures implemented in the form of circuits. The controller 44 transmits an instruction to the light emitter 55 to turn the light emitting element on or off. The controller 54 also receives the detection result by the load sensor 56 to detect the load applied to the floor covering 14. Furthermore, the controller 54 transmits and receives any appropriate information to and from the server apparatus 10 via the communication interface 52.

Figure 6:
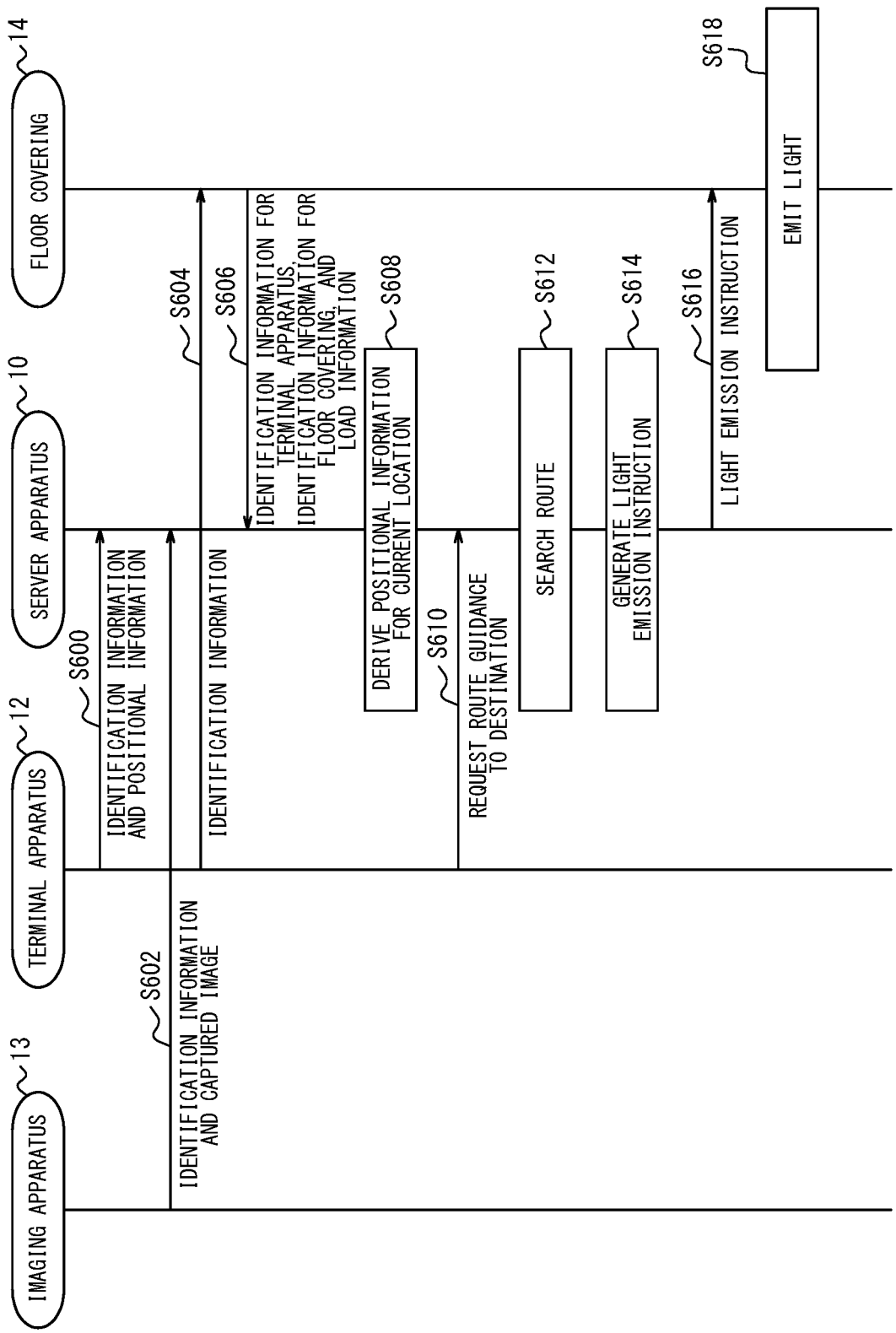
FIG. 6 is a sequence diagram illustrating an operation example of the information processing system.

FIG. 6 is a sequence diagram illustrating an operation example of the information processing system 1. In FIG. 6, operation procedures for coordinated operation by the server apparatus 10, the terminal apparatus 12, the imaging apparatus 13, and the floor covering 14 are illustrated. The procedures in FIG. 6 are procedures for the information processing system 1 to assist with route guidance from the current location of the pedestrian to the destination. Here, the current location of the pedestrian corresponds to the "first point", and the destination corresponds to the "second point".

In step S600, the terminal apparatus 12 transmits identification information for the terminal apparatus 12 and the positional information for the current location to the server apparatus 10. After deriving the positional information for the current location using the GPS signal received by the communication interface 31, the controller 33 of the terminal apparatus 12 transmits the positional information for the current location and the identification information for the terminal apparatus 12 stored in advance in the memory 32 to the server apparatus 10 via the communication interface 31. The controller 22 of the server apparatus 10 receives the identification information for the terminal apparatus 12 and the positional information for the current location via the communication interface 20.

In step S602, the imaging apparatus 13 transmits a captured image and identification information for the imaging apparatus 13 to the server apparatus 10. The controller 44 of the imaging apparatus 13 captures an image of a portion of the area with the camera 41 at any appropriate timing, or periodically, and stores the captured image in the memory 43. The controller 44 transmits the captured image and the identification information for the imaging apparatus 13 at any appropriate timing, or periodically, to the server apparatus 10 via the communication interface 42. The identification information is stored in the memory 43 in advance. The controller 22 of the server apparatus 10 receives the identification information for the imaging apparatus 13 and the captured image via the communication interface 20. Here, the server apparatus 10 receives the captured image from one or more imaging apparatuses 13 in the area.

In step S604, the terminal apparatus 12 transmits the identification information for the terminal apparatus 12 to the floor covering 14. In step S606, the floor covering 14 transmits the identification information for the terminal apparatus 12 and identification information for the floor covering 14 to the server apparatus 10. In addition to the identification information for the floor covering 14, the floor covering 14 may transmit load information indicating the load detected on the floor covering 14 to the server apparatus 10. The controller 33 of the terminal apparatus 12 transmits the identification information stored in advance in the memory 32 to the floor covering 14 via the communication interface 31. The communication interface 31 transmits the identification information to the nearest floor covering 14, specifically the floor covering that the pedestrian is stepping on, by short-range communication, for example. The communication interface 31 may transmit identifying information to the floor covering 14 via the anklet 12a or shoe 12b. The signal strength of the communication interface 31 or the signal strength of the communication apparatus of the anklet 12a, shoe 12b may be adjusted to enable selective transmission of identification information to the nearest floor covering 14. The controller 54 of the floor covering 14 receives the identification information for the terminal apparatus 12 via the communication interface 52. The controller 54 detects the load applied by the pedestrian stepping on the floor covering 14 with the load sensor 56. The controller 54 transmits the identification information for the terminal apparatus 12 and the identification information for the floor covering 14 that is stored in advance in the memory 53, and may additionally transmit the load information, to the server apparatus 10 via the communication interface 52. The controller 22 of the server apparatus 10 receives, via the communication interface 20, the identification information for the terminal apparatus 12 and the identification information for the floor covering 14 and may additionally receive the load information.

The order of step S600, step S602, and steps S604 and S606 is not limited to the example illustrated here, and this order may be changed. Furthermore, instead of all of step S600, step S602, and steps S604 and S606 being performed, one or more of these steps may be performed.

In step S608, the server apparatus 10 derives the positional information for the current location of the pedestrian.

When the identification information and the positional information are received from the terminal apparatus 12 in step S600, the controller 22 of the server apparatus 10 uses the positional information for the terminal apparatus 12 as the positional information for the current location of the pedestrian.

When the captured image is received from one or more imaging apparatuses 13 in the area in step S602, the controller 22 of the server apparatus 10 identifies an image, stored in advance in the memory 21, of the pedestrian from one or more captured images. The identification processing of the image of the pedestrian is executed for each pedestrian among one or more pedestrians. The image of the pedestrian is, for example, extracted from the captured image of the pedestrian transmitted from the terminal apparatus 12 and is stored in association with the identification information for the terminal apparatus 12 in advance in the memory 21. Upon detecting the image of the pedestrian from a certain captured image, the controller 22 identifies a range within the area imaged by the imaging apparatus 13 based on the identification information for the imaging apparatus 13 that transmitted the captured image. Then, using the point in the area corresponding to the position of the pedestrian in the captured image as the current location of the pedestrian, the controller 22 derives the positional information for the point. The controller 22 can identify the terminal apparatus 12 of the pedestrian based on the identification information for the terminal apparatus 12 associated with the image of the pedestrian.

When the identification information for the terminal apparatus 12 and the identification information for the floor covering 14 are received, with the optional additional receipt of the load information, from the floor covering 14 in step S606, the controller 22 of the server apparatus 10 identifies the point where the floor covering 14 is disposed based on the identification information for the floor covering 14. The identification information for the floor covering 14 and the information for the point where the floor covering 14 is disposed are stored in the memory 21 in advance in association with each other. Therefore, the controller 22 uses the identification information for the floor covering 14 transmitted together with the identification information for the terminal apparatus 12 to derive the point where the floor covering 14 is disposed as the positional information on the current location of the pedestrian. At that time, the acquisition of load information indicating that the load satisfies any criteria enabling recognition that the pedestrian is stepping on the floor covering 14 may be a condition for deriving the positional information on the pedestrian. This approach improves the derivation accuracy of the positional information.

The controller 22 collates the derivation results when two or more sets of positional information are derived. If the two sets match, the accuracy of the positional information is guaranteed. Conversely, when the two or more derivation results are inconsistent, the average of the derivation results may be treated as the final derivation result, for example, to improve the accuracy of the positional information.

Next, in step S610, the terminal apparatus 12 responds to input by the pedestrian and requests that the server apparatus 10 provide route guidance to the destination. When the controller 33 of the terminal apparatus 12 receives input of a destination by the pedestrian to the input/output interface 30, the controller 33 transmits a request for route guidance together with information on the destination to the server apparatus 10 via the communication interface 31. Alternatively, the controller 33 may use information on an action schedule of the pedestrian stored in the memory 32 to judge the destination corresponding to the current time. The controller 22 of the server apparatus 10 receives the positional information for the destination and the request for route guidance via the communication interface 20.

In step S612, the server apparatus 10 searches for a route from the current location of the pedestrian to the destination. In step S614, the server apparatus 10 then determines a light emission pattern for the floor covering 14 to guide the pedestrian along the path and generates a light emission instruction for the floor covering 14. The controller 22 of the server apparatus 10 searches for a route using map information stored in the memory 21 and determines any appropriate light emission pattern for the floor covering 14 corresponding to the retrieved route.

Figure 7:
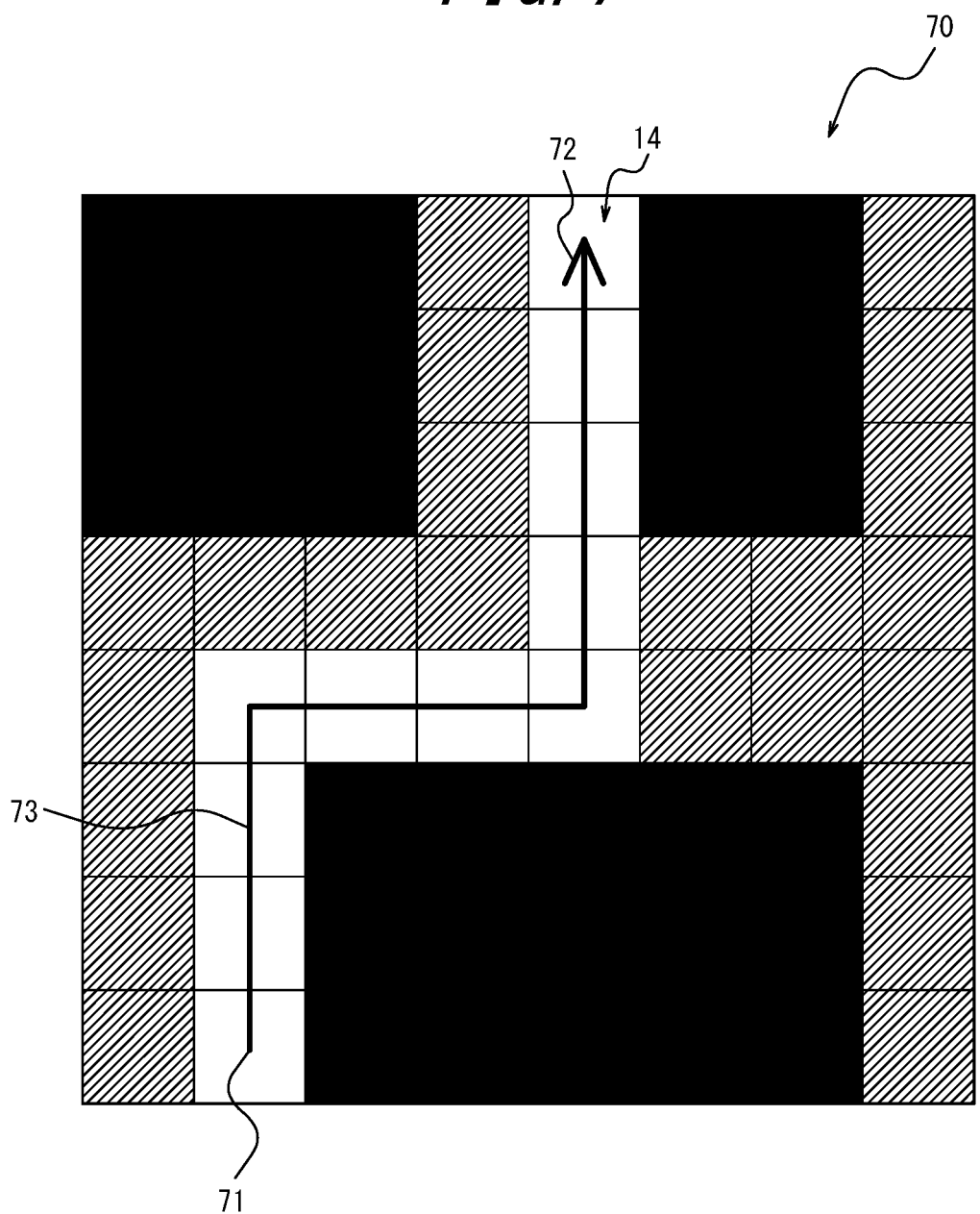
FIG. 7 is a diagram illustrating a light emission pattern of the floor covering.

FIG. 7 is a diagram illustrating the light emission pattern of the floor coverings 14. Here, the floor coverings 14 disposed on the road surface of an area 70 are indicated schematically by squares. The filled-in areas indicate areas other than the road surface. A blank square indicates floor covering 14 that emits light along the route 73 from the current location 71 to the destination 72. A hatched square indicates floor covering 14 that is not subject to light emission control. The light emission pattern of the floor covering 14 that emits light may, for example, be a pattern for causing the floor covering 14 to emit light continuously or a pattern for flashing in any appropriate cycle. Alternatively, the light emission pattern may be a pattern in which the light emission is adjusted in accordance with movement of the pedestrian. For example, in accordance with change in the positional information for the current location of the pedestrian, only the floor covering 14 that lies ahead on the route may be caused to emit light or flash, whereas the floor covering 14 that the pedestrian has stepped on may be turned off. The server apparatus 10 may also change the speed of flashing in accordance with the moving speed of the pedestrian. The server apparatus 10 may also cause the floor covering 14 to emit light, flash, or the like in a different pattern at a turn than along a straight route. Furthermore, the server apparatus 10 may cause the floor covering 14 corresponding to the boundary between a pedestrian region for pedestrians and a driving region for vehicles on the road surface to emit light in a different pattern from the light emission pattern of the floor covering 14 along the route 73. Such changes in the light emission pattern in accordance with attributes of the sections can stimulate awareness of safety for the pedestrian.

In step S616, the server apparatus 10 transmits a light emission instruction to the floor coverings 14. The controller 22 of the server apparatus 10 transmits an instruction to emit light in a manner corresponding to the light emission pattern to the floor coverings 14 disposed at positions corresponding to the guided route for the pedestrian. The controller 22 collates the positional information for each floor covering 14 stored in advance in the memory 21 with the guided route and determines the floor coverings 14 that are to emit light. The controller 54 of the floor covering 14 receives the light emission instruction via the communication interface 52.

In step S618, the floor coverings 14 emit light in response to the light emission instruction. The controller 54 of the floor covering 14 causes the light emitting element of the light emitter 55 to emit light in accordance with the light emitting instruction.

According to the present embodiment, the information processing system 1 can guide the pedestrian to the destination by causing the floor coverings 14 to emit light in any appropriate pattern. The convenience for the pedestrian is improved, since the pedestrian can recognize the route to the destination by looking at the road surface without watching route guidance by the terminal apparatus 12 that the pedestrian is carrying.

Figure 8:
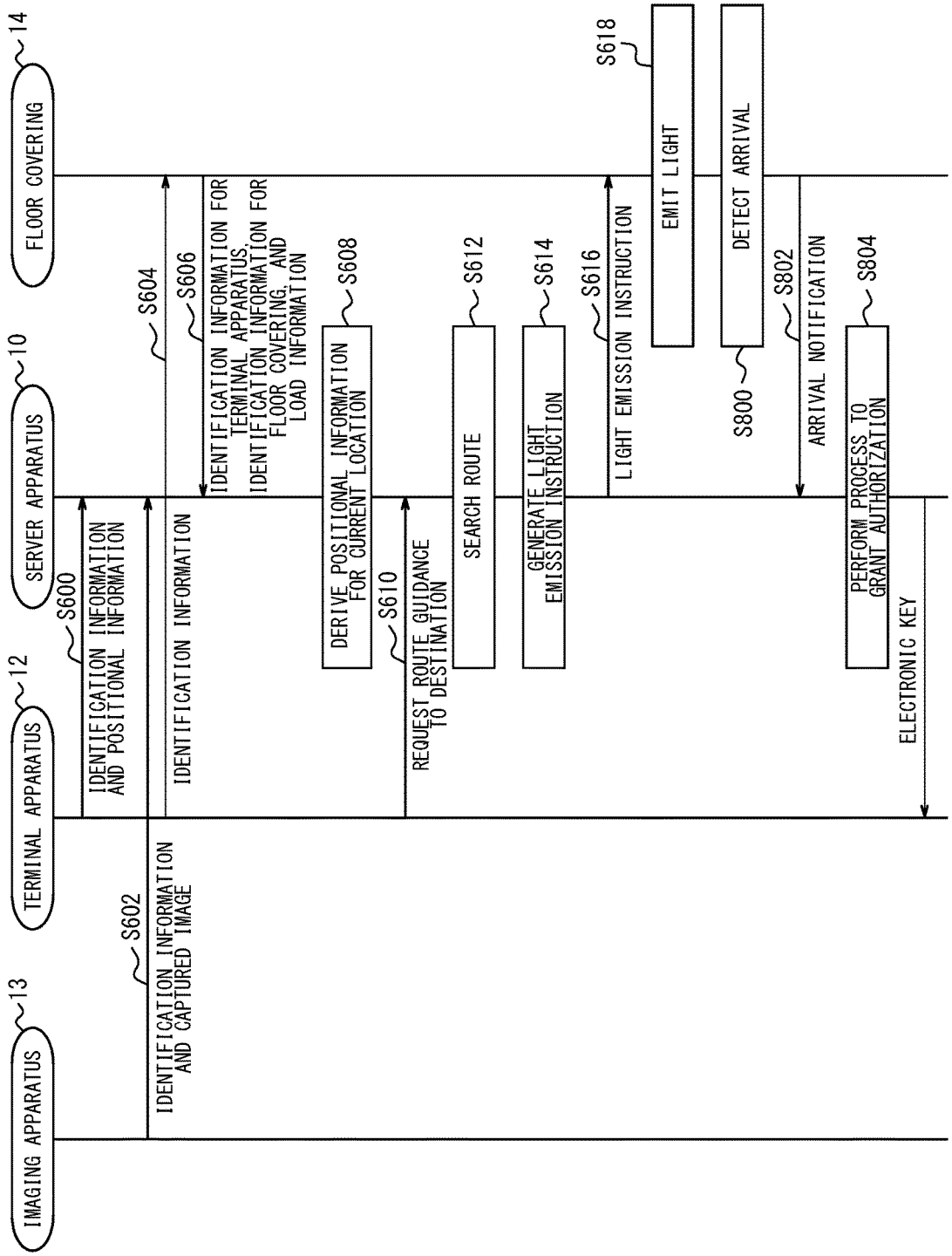
FIG. 8 is a sequence diagram illustrating an operation example of the information processing system.

FIG. 8 is a sequence diagram illustrating an operation example of the information processing system 1 according to a modification. The procedures of FIG. 8 differ from the procedures of FIG. 6 in that steps S800 to S806 are added to the procedures of FIG. 6 after step S618. Here, the differences from FIG. 6 are described, omitting a description of the same steps as in FIG. 6.

In the modification of FIG. 8, the server apparatus 10 performs an authorization granting process for the pedestrian when the pedestrian reaches the destination. For example, if the destination of the pedestrian is a dwelling, warehouse, receiving facility for delivery (including a parked vehicle) or the like that is locked and needs to be unlocked, the server apparatus 10 transmits an electronic key to the terminal apparatus 12 as the authorization granting process. The pedestrian is thereby granted authorization to unlock the facility at the destination. When a pedestrian participates in a game, for example, such as a treasure hunt in which the pedestrian earns points by arriving at a secret location provided in the area and stepping on the floor covering 14, or a stamp rally in which the pedestrian earns a stamp by arriving at a checkpoint provided in the area and stepping on the floor covering 14, the server apparatus 10 executes a process to grant a point or a stamp to the account of the pedestrian as the authorization granting process when the pedestrian reaches the destination that is the secret site or the checkpoint. The pedestrian is thereby granted authorization to exchange points or stamps for an economic value.

In step S800, the floor covering 14 detects that the pedestrian has reached the destination. In step S802, the floor covering 14 then notifies the server apparatus 10 that the pedestrian has reached the destination. For example, the controller 22 of the server apparatus 10 transmits an instruction in advance to notify the arrival of the pedestrian, together with the light emission instruction, to the floor covering 14 disposed at the destination. Upon the load sensor 56 detecting a load indicating that the load sensor 56 has been stepped on by the pedestrian, the controller 54 of the floor covering 14 at the destination transmits an arrival notification to the server apparatus 10. Alternatively, the controller 22 of the server apparatus 10 may transmit the identification information for the terminal apparatus 12 of the pedestrian in advance together with an instruction to notify arrival of the pedestrian, and the controller 54 of the floor covering 14 at the destination may transmit the arrival notification to the server apparatus 10 when the controller 54 receives the identification information from the terminal apparatus 12 via the communication interface 42. An instruction to emit light in a different pattern when arrival is detected than for route guidance may be transmitted in advance from the server apparatus 10 to the floor covering 14. To notify the pedestrian of arrival at the destination, the floor covering 14 may then emit light in a different pattern when the pedestrian arrives than during route guidance. The controller 22 of the server apparatus 10 receives the arrival notification via the communication interface 20.

In step S804, the server apparatus 10 executes the authorization granting process for the pedestrian. When the pedestrian requests that the server apparatus 10 provide route guidance from the terminal apparatus 12 to the destination prior to step S804, for example in step S610, the pedestrian transmits information to the server apparatus 10 designating the authority the pedestrian wishes to be granted upon arrival at the destination.

If the pedestrian specifies unlocking of the facility at the destination, the controller 22 of the server apparatus 10 transmits an electronic key to the terminal apparatus 12 via the communication interface 20 as the authorization granting process. Such electronic key data may be stored in advance in the memory 21. The controller 33 of the terminal apparatus 12 receives an electronic key via the communication interface 31. The controller 22 of the server apparatus 10 may set any appropriate expiration date in advance for such an electronic key. This makes it possible to grant the pedestrian an electronic key that is only valid during the limited time that the pedestrian spends within a short distance from the facility, thereby improving the safety of locking and enabling the pedestrian to acquire the electronic key only when necessary. The burden of data management associated with continuous holding of the electronic key is therefore eliminated.

When the pedestrian specifies granting of points or the like, the controller 22 of the server apparatus 10 executes a process for granting points or a stamp to the account of the pedestrian registered in advance and stored in the memory 21. At this time, the account of the pedestrian is identified by the identification information for the terminal apparatus 12. This increases interest when pedestrians walk in the area.

Furthermore, if the points have economic value usable at shops within the area, pedestrian interest can be increased while commercial activity is promoted in the area.

As described above, by light emission of the floor coverings 14 being controlled in the information processing system 1, the convenience for the pedestrian is improved, since the pedestrian can recognize the route to the destination by looking at the road surface without watching route guidance by the terminal apparatus 12 that the pedestrian is carrying. Furthermore, the convenience or interest of the pedestrian can be further increased by various types of authorization being granted when the destination is reached.

In the above embodiment, the processing and control program that defines the operations by the controller 33 of the terminal apparatus 12 may be stored in the memory 21 of the server apparatus 10 or in a memory of another server apparatus and downloaded to the terminal apparatus 12 via the network 11. The processing and control program may also be stored in a portable, non-transient recording and storage medium that is readable by the terminal apparatus 12, and the terminal apparatus 12 may read the program from the medium.

Although an embodiment has been described above based on the drawings and examples, it should be noted that various modifications and revisions may be implemented by those skilled in the art based on the present disclosure. Accordingly, such modifications and revisions are included within the scope of the present disclosure. For example, functions and the like included in the means, steps, and the like can be rearranged so as not to conflict with each other, and the multiple means, steps, and the like can be combined into one or divided.

The invention claimed is:

1. A server apparatus comprising:
a communication interface; and
a controller configured to transmit and receive information via the communication interface, wherein:
the controller is configured to transmit an instruction for controlling light emission by a plurality of floor coverings, which are disposed in an area encompassing one or more blocks of an urban zone and each of which includes a light emitting element, the instruction being transmitted to the plurality of floor coverings based on (i) first positional information for a first point where a pedestrian is located in the area and (ii) second positional information for a second point different from the first point in the area;
the controller is configured to obtain the first positional information for the first point by (i) receiving the first positional information from a terminal apparatus of the pedestrian, (ii) deriving the first positional information based on a captured image of the area, (iii) deriving the first positional information based on information received by a floor covering of the plurality of floor coverings from the terminal apparatus of the pedestrian, or (iv) deriving the first positional information by taking into account a load detected by the floor covering of the plurality of floor coverings;
the controller is further configured to search for a route from the first point to the second point, the second point being input as a destination from the terminal apparatus of the pedestrian; and
the controller is further configured to generate the instruction for controlling light emission by the plurality of floor coverings such that a light emission pattern guides the pedestrian along the route from the first point to the second point.

2. The server apparatus of claim 1, wherein the controller is configured to perform a process for granting authorization to the pedestrian when the pedestrian reaches the second point.

3. The server apparatus of claim 1, wherein when generating the instruction for controlling light emission by the plurality of floor coverings, the controller is configured to generate the instruction by taking into account an attribute of the plurality of floor coverings in the area.

4. An information processing system comprising:
a server apparatus; and
a plurality of floor coverings disposed in an area encompassing one or more blocks of an urban zone, each floor covering being configured to communicate with the server apparatus and comprising a light emitting element, wherein:
the server apparatus is configured to transmit an instruction for controlling light emission by the plurality of floor coverings, the instruction being transmitted to the plurality of floor coverings based on (i) first positional information for a first point where a pedestrian is located in the area and (ii) second positional information for a second point different from the first point in the area;
the server apparatus is configured to obtain the first positional information for the first point by (i) receiving the first positional information from a terminal apparatus of the pedestrian, (ii) deriving the first positional information based on a captured image of the area, (iii) deriving the first positional information based on information received by a floor covering of the plurality of floor coverings from the terminal apparatus of the pedestrian, or (iv) deriving the first positional information by taking into account a load detected by the floor covering of the plurality of floor coverings;
the server apparatus is further configured to search for a route from the first point to the second point, the second point being input as a destination from the terminal apparatus of the pedestrian;
the server apparatus is further configured to generate the instruction for controlling light emission by the plurality of floor coverings such that a light emission pattern guides the pedestrian along the route from the first point to the second point; and
the plurality of floor coverings are configured to cause the light emitting elements to emit light in accordance with the instruction.

5. The information processing system of claim 4, wherein the server apparatus is configured to perform a process for granting authorization to the pedestrian when the pedestrian reaches the second point.

6. An operating method for an information processing system comprising a server apparatus and a plurality of floor coverings disposed in an area encompassing one or more blocks of an urban zone, each floor covering being configured to communicate with the server apparatus and comprising a light emitting element, the operating method comprising:
transmitting, by the server apparatus, an instruction for controlling light emission by the plurality of floor coverings, the instruction being transmitted to the plurality of floor coverings based on (i) first positional information for a first point where a pedestrian is located in the area and (ii) second positional information for a second point different from the first point in the area;

obtaining, by the server apparatus, the first positional information for the first point by (i) receiving the first positional information from a terminal apparatus of the pedestrian, (ii) deriving the first positional information based on a captured image of the area, (iii) deriving the first positional information based on information received by a floor covering of the plurality of floor coverings from the terminal apparatus of the pedestrian, or (iv) deriving the first positional information by taking into account a load detected by the floor covering of the plurality of floor coverings;

searching, by the server apparatus, for a route from the first point to the second point, the second point being input as a destination from the terminal apparatus of the pedestrian;

generating, by the server apparatus, the instruction for controlling light emission by the plurality of floor coverings such that a light emission pattern guides the pedestrian along the route from the first point to the second point; and causing, by the plurality of floor coverings, the light emitting elements to emit light in accordance with the instruction.

7. The operating method of claim 6, further comprising performing, by the server apparatus, a process for granting authorization to the pedestrian when the pedestrian reaches the second point.

* * * * *